United States Patent [19]

Wakahara et al.

[11] 3,999,055
[45] Dec. 21, 1976

[54] MOUNTING DEVICE FOR MOUNTING A FLASHLIGHT UNIT TO A CAMERA BODY

[75] Inventors: Shigeo Wakahara, Yokohama; Kouichi Takahata, Tokyo; Toshio Dobashi, Kawasaki, all of Japan

[73] Assignee: Nippon Kogaku K.K., Tokyo, Japan

[22] Filed: Sept. 26, 1975

[21] Appl. No.: 617,239

[30] Foreign Application Priority Data

Oct. 4, 1974 Japan ............... 49-119311[U]
Dec. 25, 1974 Japan ............... 49-156733[U]

[52] U.S. Cl. ................ 240/1.3; 24/201 S;
240/2 C; 240/52.1; 354/126; 354/293
[51] Int. Cl.² .................................. G03B 15/02
[58] Field of Search ........... 354/126, 145, 82, 293;
240/1.3, 2 C, 52.1; 24/201 S, 230 SL, 230 AL,
224 LS

[56] References Cited
UNITED STATES PATENTS 3,852,788   12/1974   Ueda ................ 354/126 X Primary Examiner—John Gonzales
Attorney, Agent, or Firm—Fitzpatrick, Cella, Harper & Scinto

[57] ABSTRACT

In a mounting device for mounting a flashlight unit to a camera body with coupling established between a base secured to the camera body and a base secured to the flashlight unit, one of the two bases has a protrusion and the other base includes a recess for receiving the protrusion therein, a restraining member having a restraining position for restraining the protrusion and a nonrestraining position for releasing the protrusion, a biasing member biased to retain the restraining member in its nonrestraining position when it is in such position but adapted to release the restraining member upon coupling of the two bases to permit the restraining member to move to its restraining position, a first release member for bringing the restraining member to its nonrestraining position, and a second release member for preventing the restraining member from being moved to its nonrestraining position by the first release member.

11 Claims, 7 Drawing Figures

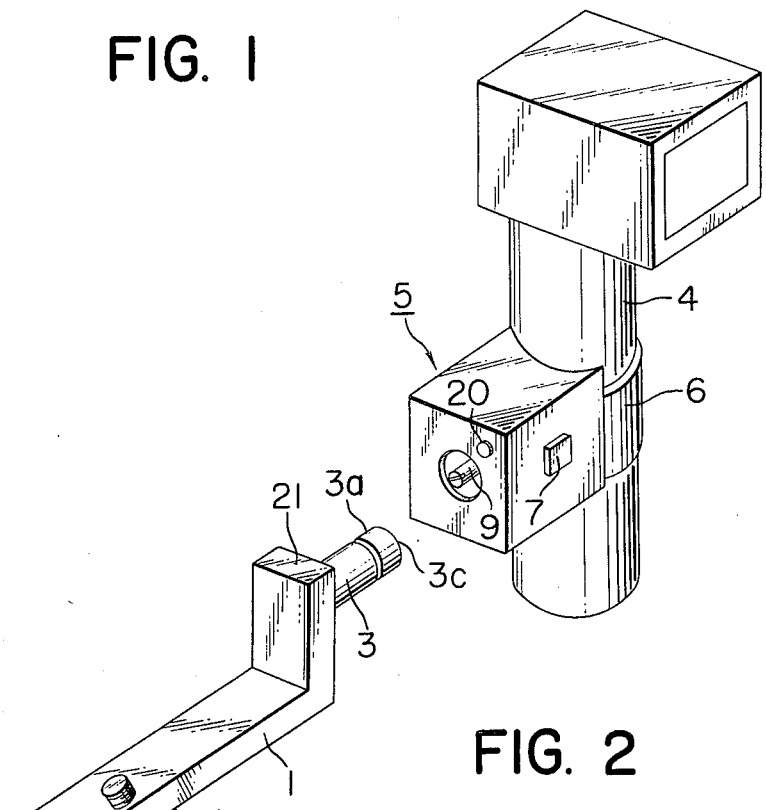
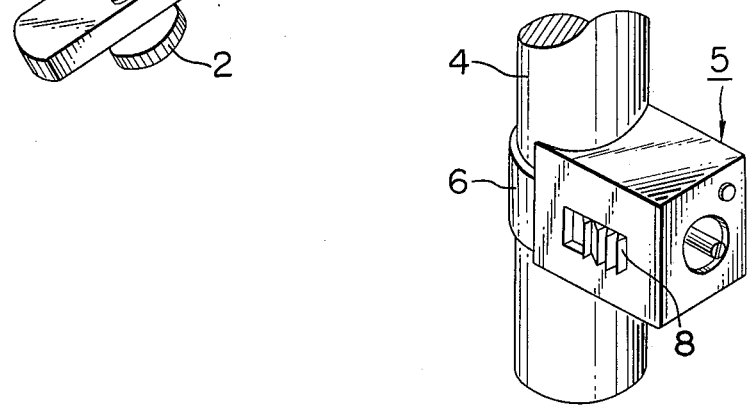

MOUNTING DEVICE FOR MOUNTING A FLASHLIGHT UNIT TO A CAMERA BODY

BACKGROUND OF THE INVENTION

1. Field of the Invention

This invention relates to a mounting device, and more particularly to a device for mounting a flashlight unit to a camera body.

2. Description of the Prior Art

There has heretofore been proposed a mounting-dismounting device which enables a flashlight unit to be mounted and dismounted with respect to a camera by one manual pressure contact. Such mounting-dismounting device of the prior art has a disadvantage in that if the release member thereof should inadvertently be contacted when the device is being used with a camera of a flashlight unit held thereon, the coupling between the camera and the flashlight unit will be released to cause a slip-out or disconnection and consequent damage of the flashlight unit or the camera.

In order to prevent this, there has also been proposed a mounting-dismounting device in which the release member is provided with a locking screw so that the tightening of the screw inhibits operation of the release member. This type of mounting-dismounting device however requires that the screw be tightened and loosened to effect mounting and dismounting of the flashlight unit with respect to the camera, and this is inconvenient.

Furthermore, when it is desired to effect photography utilizing bounce light, the flashlight unit must be mounted to the camera body at a certain angle therewith. (Such mounting operation will hereinafter be referred to as "bounce operation"). The mounting-dismounting device of such type has required the connection between the flashlight unit and the camera body to be completely broken away for carrying out bounce operation. This has not only made the bounce operation difficult to do, but also caused the risk of slip-out of the camera or the flashlight.

SUMMARY OF THE INVENTION

We have conceived and contribute, by the present invention, means by which we are able to overcome the aforementioned difficulties and disadvantages and to provide a mounting device for mounting a flashlight unit to a camera whereby mounting of the flashlight unit to the camera may be achieved by a single manual effort and which permits dismounting of the flashlight unit to be effected by operation of two release members.

We are also able, by our present invention, to provide a camera body and a flashlight unit which can enable even the bounce operation to be accomplished easily and reliably.

According to the present invention, there is provided a mounting device for mounting a flashlight unit to a camera body by the coupling between a base secured to the camera body and a base secured to the flashlight unit, in which one of the two bases has a protrusion and the other base includes a recess for receiving the protrusion therein, a restraining member for restraining the protrusion in its restraining position and for releasing the protrusion in its nonrestraining position, the restraining member being normally biased to its restraining position, and a biasing member biased to retain the restraining member in the nonrestraining position when it is in such position. The biasing member is adapted to release its own retention upon the coupling action of the two bases to permit movement of the restraining member to the restraining position. The other of the two bases further includes a first release member for bringing the restraining member to the nonrestraining position, and a second release member biased to prevent the movement of the restraining member to the non-restraining position imparted by the first release member. Thus, the retention by the biasing member may be released upon the coupling action of the two bases and the coupling of the two bases may be maintained by engagement between the restraining member when in the restraining position and the protrusion. Also, the second release member may be moved to permit the restraining member to be moved to the nonrestraining position by the first release member, thereby disengaging the restraining member from the protrusion and uncoupling the two bases.

There has been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIG. 1 is a perspective view of a first embodiment of the present invention;

FIG. 2 is a perspective view showing a portion of the first embodiment;

DESCRIPTION OF THE PREFERRED EMBODIMENTS

Figure 3:
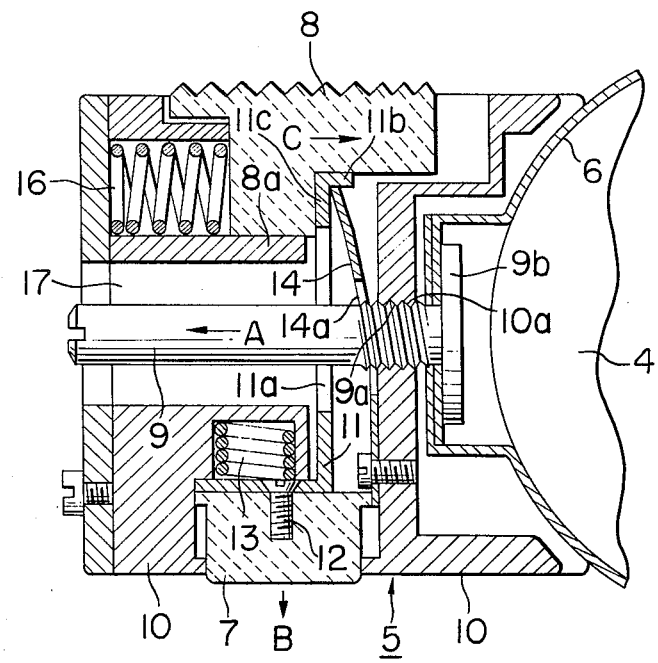
FIGS. 3 and 4 are cross-sectional views illustrating the manner in which mounting is effected by the first embodiment.

Referring to FIG. 1 which pictorially shows the general configuration of a first embodiment of the present invention, a camera side base 1 has a mounting screw 2 for securing the base to a camera body, not shown, and a cylindrically shaped protrusion 3 which has a groove 3a formed circumferentially therein near its distal end.

A flashlight unit side base 5 is secured to a flashlight unit 4 by means of a mounting belt 6.

The two bases 1 and 5 together constitute a mounting device.

The flashlight unit side base 5 has a first release member 7 and a second release member 8, which is clearly shown in FIG. 2.

Figure 4:
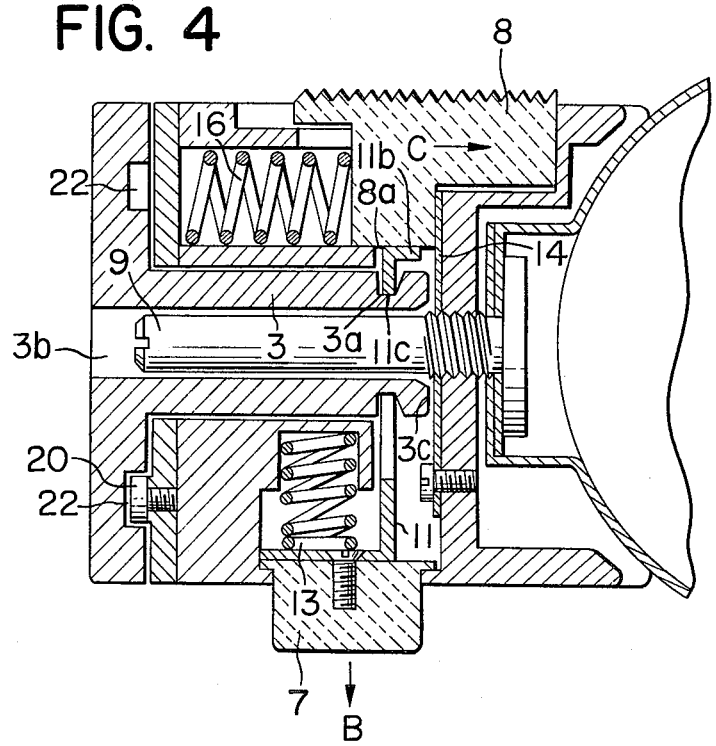

The interior construction of the base 5 is particularly shown in FIGS. 3 and 4. A mounting shaft 9 has a threaded portion 9a for threadable engagement with the threaded portion 10a of the body 10 of the base 5, and a flanged portion 9b at one end. When the mounting shaft 9 is rotatively shifted in the direction of arrow A, the flanged portion 9b tightens the opposite ends of the mounting belt 6 thereby to secure the base 5 to the flashlight unit 4.

The first release member 7, which is slidable in the direction of arrow B, has a restraining plate 11 secured thereto by means of a screw 12, the restraining plate 11 having an elliptically shaped slot 11a formed centrally thereof and extending in the direction of its sliding movement. The elliptically shaped slot 11a is adapted to receive therein the protrusion 3 on the base 1. The restraining plate 11 is biased in the direction of arrow B by a spring 13. A leaf spring 14 is secured at one end to the body 10 and has its free end biased leftwardly, as viewed, into engagement with the bent portion 11b of the restraining plate 11, as shown in FIG. 3, thereby preventing the restraining plate 11 from being shifted in the direction of arrow B by the spring 13. The leaf spring 14 has an opening 14a through which the mounting shaft 9 may pass. The second release member 8, which is slidable in the direction of arrow C, is biased in that direction by a spring 16.

The operation of the device thus far described, is as follows:

When the flashlight unit is to be attached to the camera body with the two bases 1 and 5 coupled together, the protrusion 3 of the base 1 is first inserted into a recess 17 in the base 5. The protrusion 3, as is clearly shown in FIG. 4, is also formed with a recess 3b, in which the mounting shaft 9 is received. The end 3c of the protrusion 3 passes through the elliptically shaped slot 11a to bear against and move rightwardly the leaf spring 14 against its spring force. With this movement, the free end of the leaf spring is disengaged from the bent portion 11b of the mounting plate 11, whereupon the restraining plate 11 is caused to slide in the direction of arrow B by the spring 13 until an engaging portion 11c, constituted by the inner edge of the top of the slot 11a, comes into engagement with the circumferentially extending groove 3a of the protrusion 3, as shown in FIG. 4, whereby the protrusion 3 is restrained by the restraining plate 11. At the same time, the second release member 8 is liberated from the restraint of the restraining plate 11 and is caused to slide in the direction of arrow C by the spring 16. Thus, the position of the parts as shown in FIG. 4 is attained.

In this manner, the coupling between the two bases 1 and 5 is completed and in this condition, these two bases cannot be uncoupled because of the engagement between the engaging portion 11c and the groove 3a.

Turning back to FIG. 1, description will now be made of the operation of a projection 20 formed on the base 5 as clearly shown there.

In the surface 21 of the bent portion of the base 1, a number of bores are formed around a circle about the protrusion 3 and may receive the projection 20 therein. Two of such bores are indicated at 22 in FIG. 4.

With the two bases coupled together, the projection 20 fits in one of the bores 22 to prevent relative rotation of the two bases. Obviously, by selecting a combination of the projection 20 and one of the bores in which the projection is to be received, it will be possible to some extent to mount the flashlight unit in any desired inclined relationship with respect to the camera.

To uncouple the two bases, namely, to dismount the flashlight unit from the camera body, the second release member 8 is first shifted in a direction against the force of the spring 16 until, as in FIG. 4, the bottom surface 8a of the second release member is brought out of the opposed position with respect to the bent portion 11b of the restraining plate 11. Thereafter, the first release member 7 is shifted in the direction opposite to the arrow B, against the force of the spring 13, thereby moving the engaging portion 11c of the restraining plate 11 out of engagement with the groove 3a on the protrusion 3. The protrusion is thus freed from restraint to permit the two bases 1 and 5 to be withdrawn from each other, and enabling the flashlight unit to be removed from the camera body.

On the other hand, the free end of the leaf spring 14 moves leftwardly by its own resilient force as the protrusion 3 is withdrawn out of the recess in the base 5, so that the free end of the leaf spring engages the bent portion 11b of the restraining plate 11 to hold the plate 11 in its position as shown in FIG. 3. The second release member 8 is also held in its position as in FIG. 3 due to its engagement with the restraining plate 11.

Figure 5:
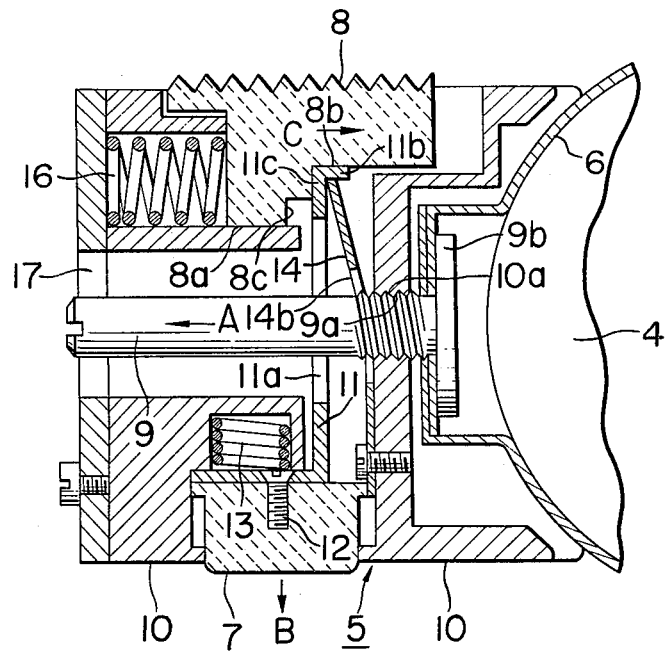
FIGS. 5, 6 and 7 are cross-sectional views illustrating the manner in which mounting is effected by a second embodiment of the present invention.
Figure 6:
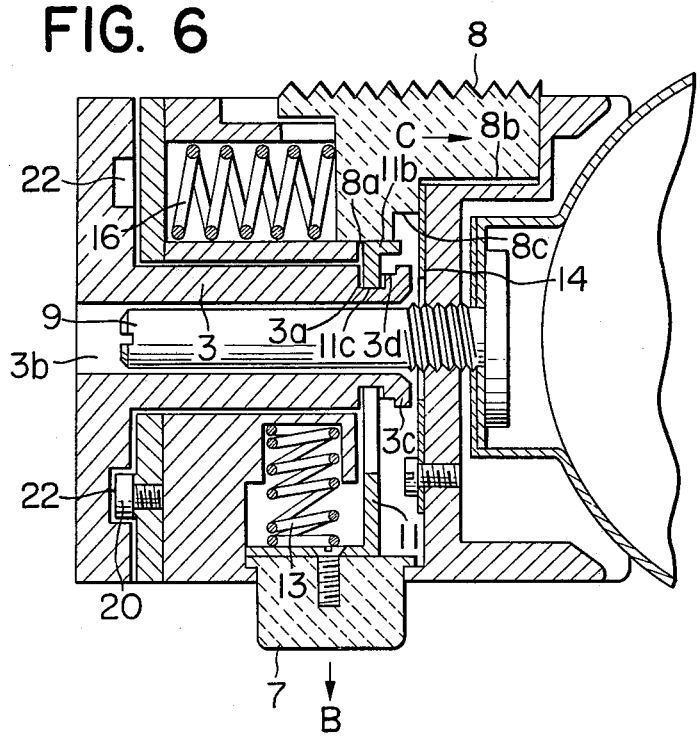
Figure 7:
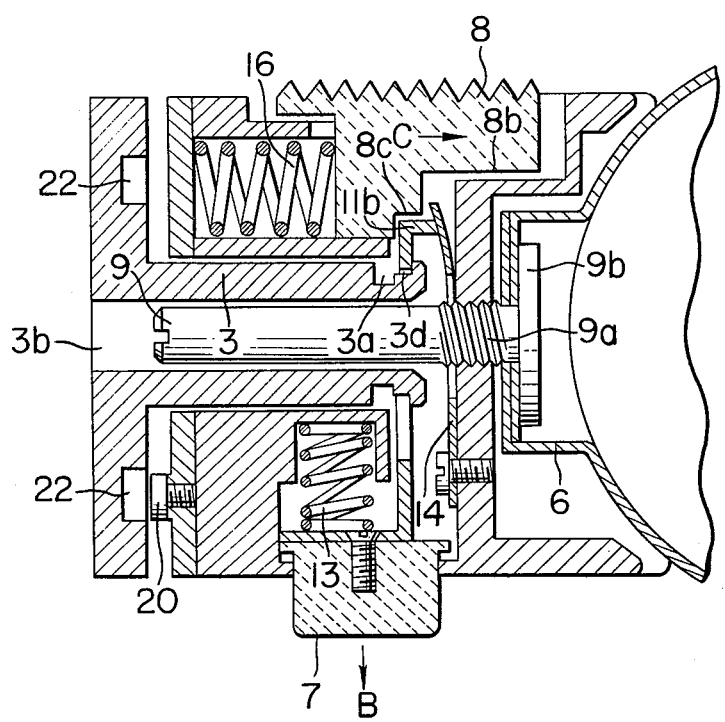

A second embodiment shown in FIGS. 5, 6 and 7 structurally differs from the first embodiment in that the protrusion 3 of the camera body side base has a deep groove 3a formed circumferentially therein and a shallow groove 3d formed toward the distal end of the protrusion 3 and immediately adjacent to the deep groove 3a. Another difference resides in the fact that the second release member 8 in the present embodiment has a first shoulder 8b and a second shoulder 8c at the inner side thereof and as shown in FIG. 5, the bent portion 11b of the restraining plate 11 being in engagement with the first shoulder 8b when the restraining plate 11 is brought into its nonrestraining position by the leaf spring 14. Further, when the restraining plate 11 is engaged with the shallow groove 3d as shown in FIG. 7, the bent portion 11b of the restraining plate 11 engages the second shoulder 8c, and when the restraining plate 11 is engaged with the deep groove 3a, the bent portion 11b of the restraining plate 11 engages the bottom surface 8a of the second release member.

In the other points of configuration and mechanism, the second embodiment is very much identical with the first embodiment.

Operation of this second embodiment will now be described.

Where the flashlight unit is to be attached to the camera body with the two bases 1 and 5 coupled together, the procedures involved are just the same as those described in connection with the first embodiment, with only the following exceptions. The grooved portion of the protrusion 3 is divided into two stepped portions 3a and 3d so that, when the two bases 1 and 5 are coupled together, engagement occurs between the deep groove 3a and the restraining plate 11, as shown in FIG. 6. Again in this case, the engagement between the projection 20 formed on the flashlight unit and one of the bores formed in the protrusion 3 prevents relative rotation of the two bases 1 and 5, in the same manner as described with respect to the first embodiment. In such position, the two bases cannot be uncoupled without the two release members being operated.

Description will now be made of the bounce operation which is a point of difference of the second embodiment from the first one.

For the bounce operation, the second release member 8 is pushed from the position of FIG. 6 in the opposite direction to the arrow C, against the force of the spring 16, until the bottom surface 8a thereof is disengaged from the bent portion 11b of the restraining plate 11 while the second shoulder 8c comes into opposed relationship with respect to the bent portion 11b of the restraining plate 11. To permit easy recognition of such position, a suitable index mark or click stop means may be provided between the second release member 8 and the body 10.

When the first release member 7 is now pushed in the opposite direction to that of the arrow B against the force of the spring 13, the bent portion 11b of the restraining plate 11 comes into engagement with the second shoulder 8c of the second release member 8. If the camera body and the flashlight unit 4 are then withdrawn somewhat away from each other, the shallow groove 3d on the camera body side protrusion 3 will engage the restraining plate 11 to bring the parts into the position as shown in FIG. 7. In this position, the projection 20 provided on the flashlight unit is brought out of engagement with one of the bores formed in the protrusion 3 thereby to permit the flashlight unit 4 to be rotated with respect to the protrusion 3.

As the result, the two bases are adjustable so as to be coupled together with any desired inclination relative to each other and, moreover, the engagement maintained between the end of the restraining plate 11 and the shallow groove 3d of the protrusion 3 during such operation, prevents inadvertent uncoupling of the two bases.

When the protrusion 3 is again pushed toward the flashlight unit, re-engagement occurs between one of the bores 22 and the projection 20 as shown in FIG. 6 to complete the coupling of the two bases with any desired relative inclination, and thus the camera body and the flashlight unit are in mutually fixed relationship.

According to the present invention, as has been described above, mounting of the flashlight unit to the camera body may be automatically completed simply by inserting the protrusion of the camera body side base into the flashlight unit side base and, once the mounting has been completed, the coupling between the two cannot be released even if one of the release members is actuated, but coupling can occur when both the first and second release members are operated. Thus, the coupling of te two bases can be completed by one operation and thereafter any inadvertent uncoupling cannot occur.

Further, during the bounce operation the connection maintained between the camera body and the flashlight unit makes the operation simple and prevents the flashlight unit from slipping or dropping out of the camera body.

We believe that the construction and operation of our novel mounting device will now be understood and that the advantages thereof will be fully appreciated by those persons skilled in the art.

We claim:

1. In a mounting device having one base secured to a camera body and another base secured to a flashlight unit, for mounting the flashlight unit to the camera body by coupling of said two bases, one of said two bases comprising:
  a. a protrusion;
  the other base including:
  b. a recess for receiving said protrusion therein;
  c. a restraining member for restraining said protrusion in its restraining position and for releasing said protrusion in its non-restraining position;
  d. means normally biasing said restraining member to its restraining position;
  e. a biasing member biased to retain said restraining member in said nonrestraining position, said biasing member being adapted to release such retention upon coupling action of said two bases to permit movement of said restraining member to said restraining position;
  f. an externally accessible first release member for bringing said restraining member to said nonrestraining position;
  g. an externally accessible second release member; and
  h. means urging said second release member to a position to prevent movement of said restraining member to said nonrestraining position;
whereby the retention by said biasing member may be released upon coupling action of said two bases and the coupling of said two bases may be maintained by engagement between said restraining member when in said restraining position and said protrusion, and said second release member may be moved to permit said first release member to bring said restraining member to said non-restraining position, thereby disengaging said restraining member from said protrusion and uncoupling said two bases.

2. A mounting device as defined in claim 1, wherein said protrusion is cylindrically shaped and has a cut-away portion engageable by said restraining member, and wherein said device further has means for preventing relative rotation of said two bases when said restraining member has engaged said cut-away portion.

3. A mounting device as defined in claim 1, wherein said protrusion is cylindrically shaped and has a first and a second cut-away portion engageable by said restraining member, and wherein said device further has means for preventing relative rotation of said two bases only when said restraining member has engaged said first cut-away portion.

4. A mounting device as defined in claim 2, wherein said cut-away portion is a groove formed around the circumference of said protrusion.

5. A mounting device as defined in claim 3, wherein said first and second cut-away portions are in the form of grooves over the circumference of said protrusion, with the depth of said first cut-away portion being greater than that of said second cut-away portion, said second cut-away portion being located nearer to the distal end of said protrusion than said first cut-away portion.

6. A mounting device as defined in claim 2, wherein said restraining member is in the form of a plate having an opening for passage therethrough of said protrusion and is perpendicularly movable with respect to said protrusion and into engagement with said cut-away portion.

7. A mounting device as defined in claim 3, wherein said restraining member is in the form of a plate having an opening for passage therethrough of said protrusion and is perpendicularly movable with respect to said protrusion and into engagement with said cut-away portions.

8. A mounting device as defined in claim 3, wherein said second release member is movable parallel to said protrusion when said biasing member permits movement of said restraining member to said restraining position.

9. A mounting device as defined in claim 2, wherein said rotation preventing member includes a plurality of bores formed on one of said bases and a projection formed on the other base and engageable within said bores, and said bores are located on a plane perpendicular to said protrusion and in a circle about said protrusion.

10. A mounting device as defined in claim 3, wherein said rotation preventing member includes a plurality of bores formed on one of said bases and a projection formed on the other base and engageable with said bores, and said bores are located on a plane perpendicular to said protrusion and in a circle about said protrusion.

11. A mounting device as defined in claim 1, wherein said protrusion is engaged with said biasing member, upon coupling action of said two bases, to move said biasing member to non-retaining position.

* * * * *

UNITED STATES PATENT AND TRADEMARK OFFICE
CERTIFICATE OF CORRECTION

PATENT NO. : 3,999,055
DATED : December 21, 1976
INVENTOR(S) : SHIGEO WAKAHARA, et al.

It is certified that error appears in the above–identified patent and that said Letters Patent are hereby corrected as shown below:

Column 1, line 18, change "camera of" to -- camera or --.
Column 5, line 46, change "coupling can" to -- uncoupling can --; line 48, change "te" to -- the --.
Column 6, line 67, change "claim 3" to -- claim 1 --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks